US012569853B2

(12) United States Patent
Cho et al.

(10) Patent No.: US 12,569,853 B2
(45) Date of Patent: Mar. 10, 2026

(54) MOLECULAR DIAGNOSIS CARTRIDGE

(71) Applicant: OPTOLANE TECHNOLOGIES INC., Gyeonggi-do (KR)

(72) Inventors: Seung Sun Cho, Gyeonggi-do (KR); Won Yong Choi, Gyeonggi-do (KR); Sang Hoon Lee, Gyeonggi-do (KR)

(73) Assignee: OPTOLANE TECHNOLOGIES INC., Gyeonggi-do (KR)

( * ) Notice: Subject to any disclaimer, the term of this patent is extended or adjusted under 35 U.S.C. 154(b) by 245 days.

(21) Appl. No.: 18/580,994

(22) PCT Filed: Jun. 24, 2022

(86) PCT No.: PCT/KR2022/009072

§ 371 (c)(1),
(2) Date: Jan. 19, 2024

(87) PCT Pub. No.: WO2023/027314

PCT Pub. Date: Mar. 2, 2023

(65) Prior Publication Data

US 2025/0091053 A1 Mar. 20, 2025

(30) Foreign Application Priority Data

Aug. 24, 2021 (KR) ........................ 10-2021-0111344

(51) Int. Cl.
*B01L 9/00* (2006.01)

(52) U.S. Cl.
CPC ......... *B01L 9/527* (2013.01); *B01L 2200/025* (2013.01); *B01L 2200/04* (2013.01);
(Continued)

(58) Field of Classification Search
CPC ............... B01L 9/527; B01L 2200/025; B01L 2200/04; B01L 2300/043;
(Continued)

(56) References Cited

U.S. PATENT DOCUMENTS 9,925,540 B2 3/2018 Watanabe et al.
2012/0184025 A1* 7/2012 Kawata ............... B01L 3/50825 435/287.2

(Continued)

FOREIGN PATENT DOCUMENTS

GB 2149187 A 6/1985
JP 60-57312 U 4/1985

(Continued)

OTHER PUBLICATIONS

Office Action from corresponding Japanese Patent Application No. 2023-580545 dated Dec. 10, 2024. (Google Translation).

(Continued)

*Primary Examiner* — Tony Ko
(74) *Attorney, Agent, or Firm* — Christensen, Fonder, Dardi; Diane E. Bennett; Peter S. Dardi

(57) ABSTRACT

Disclosed is a molecular diagnosis cartridge which is formed so that a molecular diagnosis chip can be easily inserted therein. The molecular diagnosis cartridge accommodating the molecular diagnosis chip comprises: a cartridge bottom member arranged on the lower portion; a hinge sub-ring arranged along the outer circumference of the cartridge bottom member; a cartridge outline member which is accommodated in a space defined by the hinge sub-ring fastened with the cartridge bottom member; a chip sliding member which has a shape surrounding the molecular diagnosis chip, is arranged on the cartridge outline member, and accommodates the molecular diagnosis chip that is inserted in an inclined direction; and a torsion spring-like member which is fastened with a kind of a seesaw axle protruding from the inner wall of the cartridge outline member, supports the chip sliding member to be inclined with respect to the cartridge bottom member in an open mode operation, and supports the chip sliding member to be parallel to the cartridge bottom member in a close mode
(Continued)

operation. According to the present invention, the molecular diagnosis chip is inclinedly inserted in the chip sliding member, and easiness in insertion of the molecular diagnosis chip can be achieved. Also, as the cartridge cover is pressed, the chip sliding member accommodating the molecular diagnosis chip makes a seesaw movement on the basis of the seesaw axle and is moved to the cartridge bottom member, and thus, the molecular diagnosis chip arranged in the chip sliding member can be seated in the molecular diagnosis cartridge.

10 Claims, 9 Drawing Sheets

(52) U.S. Cl.
CPC . *B01L 2300/043* (2013.01); *B01L 2300/0627* (2013.01); *B01L 2300/0803* (2013.01)

(58) Field of Classification Search
CPC ..... B01L 2300/0627; B01L 2300/0803; B01L 2300/123; B01L 9/56; B01L 9/52; B01L 2300/042; G01N 35/00069; G01N 35/1095; G01N 35/00029; G01N 2035/00138; G01N 2035/00326
See application file for complete search history.

(56) References Cited

U.S. PATENT DOCUMENTS

| | | | |
|---|---|---|---|
| 2015/0251184 | A1 | 9/2015 | Wanatabe et al. |
| 2016/0271604 | A1 | 9/2016 | Lim et al. |
| 2018/0192760 | A1 | 7/2018 | Lee |
| 2018/0231531 | A1 | 8/2018 | Siciliano et al. |
| 2019/0022648 | A1 | 1/2019 | Kim et al. |
| 2022/0258928 | A1 | 8/2022 | Yoshida et al. |

FOREIGN PATENT DOCUMENTS

| | | | |
|---|---|---|---|
| JP | 2021-008310 | A | 1/2021 |
| KR | 10-1992-0002759 | A | 4/1992 |
| KR | 10-2015-0031007 | A | 5/2015 |
| KR | 10-2016-0047890 | A | 5/2016 |
| KR | 10-2016-0086937 | A | 7/2016 |
| KR | 10-1642434 | B1 | 7/2016 |
| KR | 10-2017-0024827 | A | 3/2017 |
| KR | 10-1742958 | B1 | 6/2017 |
| KR | 10-2021-0094385 | A | 11/2021 |
| WO | 2014-020977 | A1 | 2/2014 |

OTHER PUBLICATIONS

Search Report from corresponding European Patent Application No. 22861528.2 dated Aug. 29, 2025.
International Search Report from corresponding Patent Application No. PCT/KR2022/009072 dated Sep. 30, 2022.
Office Action from corresponding Korean Patent Application No. 10-2021-0111344 dated Jun. 12, 2023. (Google Translation).

* cited by examiner

MOLECULAR DIAGNOSIS CARTRIDGE

CROSS REFERENCE TO RELATED APPLICATIONS

The present application is a National Stage filing of PCT Application No. PCT/KR2022/009072 filed Jun. 24, 2022, entitled "Molecular Diagnosis Cartridge," which claims the benefit of priority based on Korean Patent Application No. 10-2021-0111344 filed on Aug. 24, 2021, the entire disclosure of which is incorporated as a part of this specification.

The present disclosure relates to a molecular diagnosis cartridge, and more particularly, to a molecular diagnosis cartridge configured to facilitate insertion of a molecular diagnosis chip.

TECHNICAL FIELD

Background Art

Molecular diagnosis is a diagnosis method that directly analyzes genes (DNA or RNA) of a target substance to reveal infection of a disease, base sequence variation, or mutation, enabling early diagnosis and efficient treatment of the disease. In particular, molecular diagnosis methods have recently been used in various medical fields, such as confirmation of disease infection, genetic testing, and pharmacogenetic testing.

Various detection methods have been developed in molecular diagnosis methods, and in particular, real-time polymerase chain reaction has recently become widely used in terms of its speed, convenience, and sensitivity of detection. In real-time polymerase chain reaction, qualitative/quantitative analysis of a target gene is performed by analyzing the wavelength of fluorescent substances using an analysis device.

DISCLOSURE OF THE INVENTION

Technical Goals

Accordingly, a technical challenge of the present disclosure is focused on this point, and an object of the present disclosure is to provide a molecular diagnosis cartridge designed to facilitate insertion of a molecular diagnosis chip by configuring a chip sliding member that accommodates the molecular diagnosis chip to open at an angle.

Technical Solutions

In order to realize the above object, according to an embodiment, a molecular diagnosis cartridge accommodating a molecular diagnosis chip includes a cartridge bottom member disposed at a lower part; a hinge sub-ring disposed along an outer edge of the cartridge bottom member; a cartridge outline member accommodated in a space defined by the hinge sub-ring coupled to the cartridge bottom member; a chip sliding member which has a shape surrounding the molecular diagnosis chip, is disposed on the cartridge outline member, and is configured to accommodate the molecular diagnosis chip inserted in an inclined direction; and torsion springs coupled to seesaw shafts protruding from an inner wall of the cartridge outline member, and configured to support the chip sliding member to be inclined with respect to the cartridge bottom member when operating in an open mode and support the chip sliding member in parallel with the cartridge bottom member when operating in a closed mode.

Advantageous Effects

According to the molecular diagnosis cartridge, the molecular diagnosis chip is inserted to be inclined into the chip sliding member, making it possible to easily insert the molecular diagnosis chip, and as a cartridge cover is pressurized, the chip sliding member accommodating the molecular diagnosis chip moves toward the cartridge bottom member through a seesaw movement about the seesaw shaft, so that the molecular diagnosis chip disposed in the chip sliding member may be seated in the molecular diagnosis cartridge.

BEST MODE FOR CARRYING OUT THE INVENTION

Figure 1:
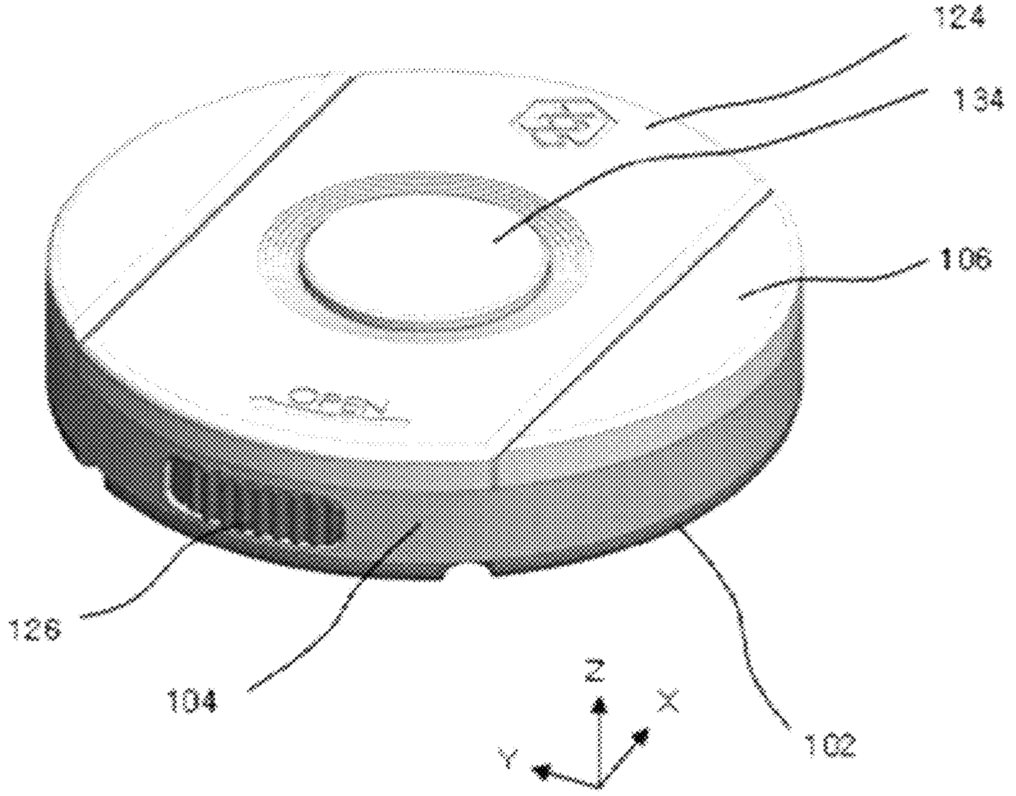
FIG. 1 is a perspective view for explaining a molecular diagnosis cartridge according to an embodiment of the present disclosure.

In order to realize the above object, according to an embodiment, the molecular diagnosis cartridge accommodating a molecular diagnosis chip includes a cartridge bottom member disposed at a lower part; a hinge sub-ring disposed along an outer edge of the cartridge bottom member; a cartridge outline member accommodated in a space defined by the hinge sub-ring coupled to the cartridge bottom member; a chip sliding member which has a shape surrounding the molecular diagnosis chip, is disposed on the cartridge outline member, and is configured to accommodate the molecular diagnosis chip inserted in an inclined direction; and torsion springs coupled to seesaw shafts protruding from an inner wall of the cartridge outline member, and configured to support the chip sliding member to be inclined with respect to the cartridge bottom member when operating in an open mode and support the chip sliding member in parallel with the cartridge bottom member when operating in a closed mode.

In an embodiment, the torsion springs may include a first torsion spring coupled to a first seesaw shaft protruding from a first inner wall of the cartridge outline member; and a second torsion spring coupled to a second seesaw shaft protruding from a second inner wall of the cartridge outline member.

In an embodiment, the chip sliding member may include a bottom part; a first sidewall part bent upward at one edge of the bottom part; a first edge part bent inward from the first sidewall part and formed with a first sliding hole and a second sliding hole; a second sidewall part bent upward at the other edge of the bottom part; and a second edge part bent inward from the second sidewall part.

In an embodiment, the molecular diagnosis cartridge may further include a first chip sliding clip which is disposed in a space defined by the bottom part, the first sidewall part, and the first edge part, includes a first sliding protrusion protruding to correspond to the first sliding hole and a second sliding protrusion protruding to correspond to the second sliding hole, and is configured to fix the inserted molecular diagnosis chip; a coil spring disposed between the first sidewall part and the first chip sliding clip and configured to retract or withdraw the first sliding clip fixing the molecular diagnosis chip in a sliding manner; a wire spring which is disposed to correspond to a valley formed in the first chip sliding clip, includes one end serving as a guide and the other end acting as a helmsman, and is configured to move along the valley while bending; and a first updown sliding boss coupled to an outer side of the first sidewall part to face the first chip sliding clip with respect to the first sidewall part.

In an embodiment, the molecular diagnosis cartridge may further include a second chip sliding clip disposed in a space defined by the bottom part, the second sidewall part, and the second edge part, and configured to fix the inserted molecular diagnosis chip; and a second updown sliding boss coupled to an outer side of the second sidewall part to face the second chip sliding clip with respect to the second sidewall part.

In an embodiment, the molecular diagnosis cartridge may further include a cartridge cover which includes a hinge groove formed to accommodate a first hinge protrusion and a second hinge protrusion of the hinge sub-ring, and is configured to be partially coupled to the hinge sub-ring as the first hinge protrusion and the second hinge protrusion are inserted into the hinge groove.

In an embodiment, the molecular diagnosis cartridge may further include a lever switch, wherein a body of the lever switch is disposed on an inner wall of the hinge sub-ring, and a finger protrusion formed on the body is exposed to an outer side through a hole formed in the inner wall of the hinge sub-ring; and a lever spring in which one end is coupled to the inner wall of the hinge sub-ring, and the other end is coupled to one side of the lever switch.

In an embodiment, the molecular diagnosis cartridge may further include a PCB disposed between the cartridge outline member and the cartridge bottom member; and a photo sensor chip mounted on the PCB.

In an embodiment, in each of the cartridge outline member and the chip sliding member, a through hole is formed to expose the photo sensor chip.

In an embodiment, the molecular diagnosis cartridge may further include a window member disposed on the molecular diagnosis chip inserted into the chip sliding member to press the molecular diagnosis chip according to a user's pressure, and exposed to a hole formed in a cartridge cover.

MODES FOR CARRYING OUT THE INVENTION

Hereinafter, the present disclosure will be described in more detail with reference to the attached drawings. Since the present disclosure may be variously modified and may have various forms, specific embodiments will be illustrated in the drawings and described in detail in the detailed description. However, this is not intended to limit the present disclosure to a specific disclosed form, and it should be understood that all modifications, equivalents, and substitutes are included in the spirit and scope of the present disclosure.

In describing each drawing, similar reference numerals are used for similar components. In the attached drawings, the dimensions of structures are enlarged from the actual sizes for clarity of the present disclosure.

Terms such as first and second may be used to describe various components, but the components should not be limited by the terms. The terms are used only for the purpose of distinguishing one component from another. For example, a first component may be referred to as a second component without departing from the scope of the present disclosure, and similarly, the second component may also be referred to as a first component. Singular expressions include plural expressions unless the context clearly means otherwise.

In this specification, it should be understood that terms such as "include" or "have" are intended to designate the presence of features, numbers, steps, operations, components, parts, or combinations thereof described in the specification, but do not preclude the possibility of the presence or addition of one or more other features, numbers, steps, operations, components, parts, or combinations thereof.

In addition, unless otherwise defined, all terms used herein, including technical or scientific terms, have the same meaning as those generally understood by a person skilled in the art to which the present disclosure pertains. Terms defined in dictionaries generally used should be construed to have meanings matching contextual meanings in the related art and are not to be construed as an ideal or excessively formal meaning unless otherwise defined herein.

Figure 2:
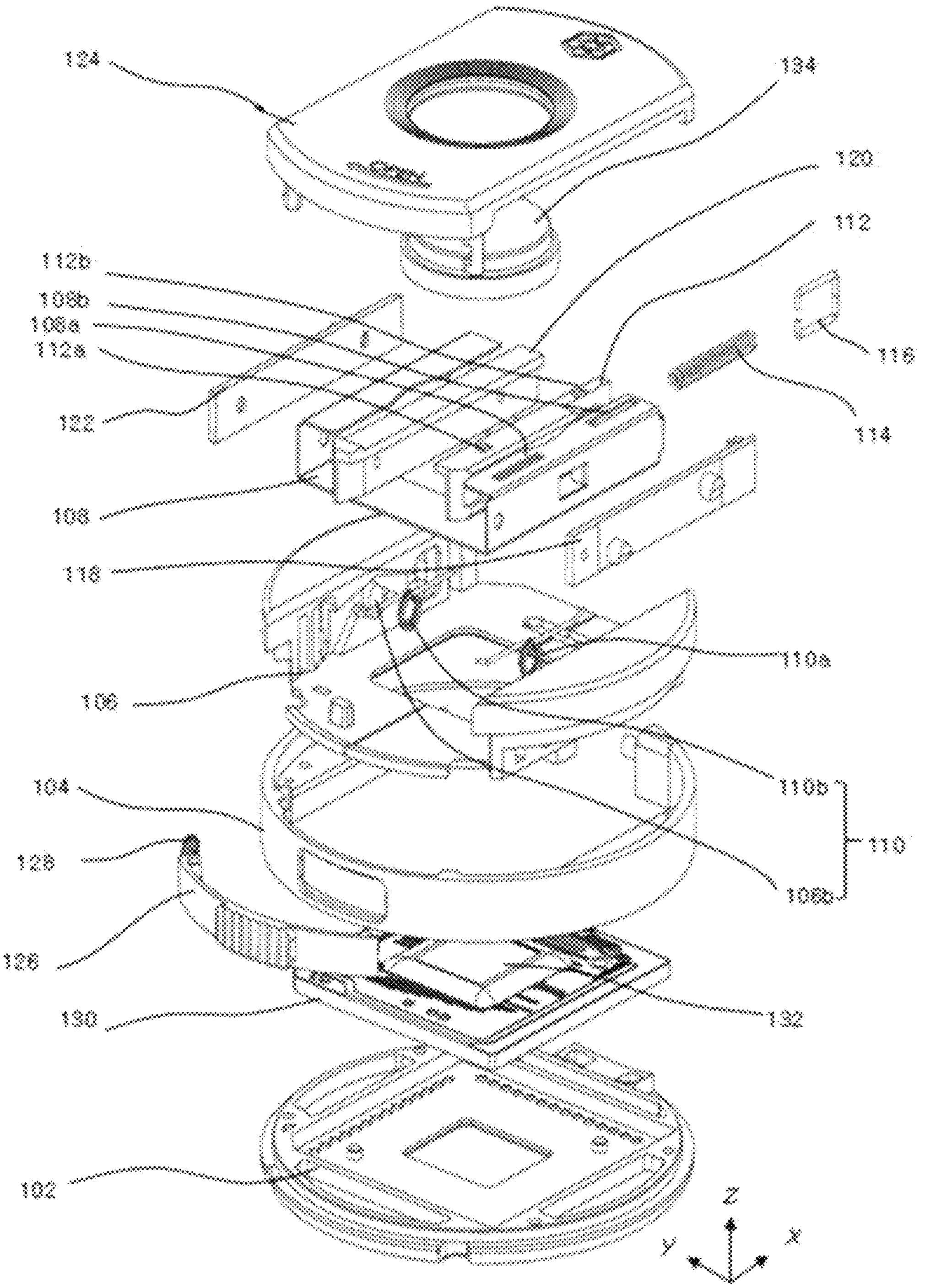
FIG. 2 is an exploded perspective view for explaining the molecular diagnosis cartridge shown in FIG. 1.
Figure 3:
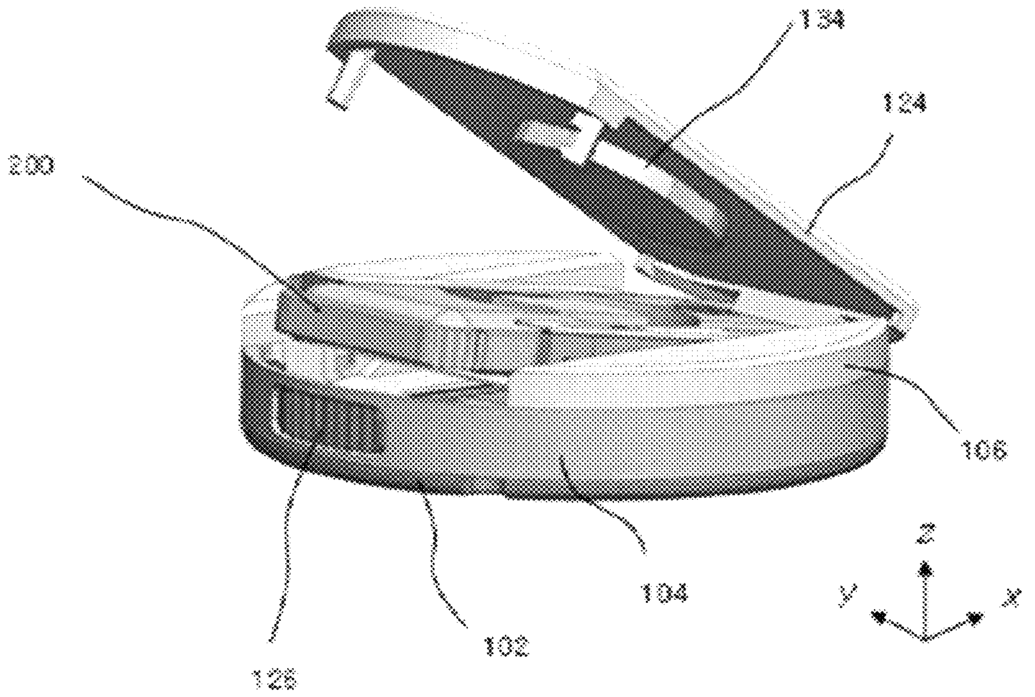
FIG. 3A is a perspective view for explaining an initial process of inserting an in vitro diagnosis chip into the molecular diagnosis cartridge shown in FIG. 2.
FIG. 3B is a perspective view in which only a partial area is extracted to explain a coupling structure of the in vitro diagnosis chip in FIG. 3A.
Figure 3B:
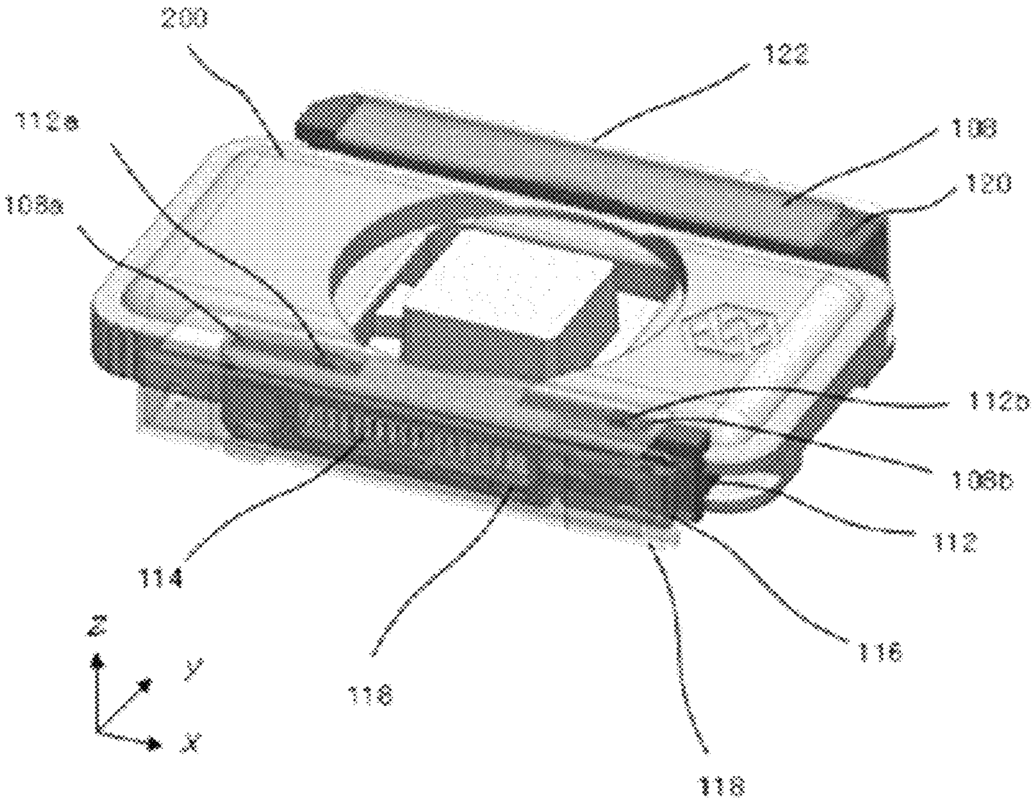

FIG. 1 is a perspective view for explaining a molecular diagnosis cartridge according to an embodiment of the present disclosure. FIG. 2 is an exploded perspective view for explaining the molecular diagnosis cartridge shown in FIG. 1. FIG. 3A is a perspective view for explaining an initial process of inserting an in vitro diagnosis chip into the molecular diagnosis cartridge shown in FIG. 2, and FIG. 3B is a perspective view in which only a partial area is extracted to explain a coupling structure of the in vitro diagnosis chip in FIG. 3A.

Referring to FIG. 1, FIG. 2, FIG. 3A, and FIG. 3B, the molecular diagnosis cartridge according to an embodiment of the present disclosure includes a cartridge bottom member 102, a hinge sub-ring 104, a cartridge outline member 106, a chip sliding member 108, torsion springs 110, a first chip sliding clip 112, a coil spring 114, a wire spring 116, a first updown sliding boss 118, a second chip sliding clip 120, a second updown sliding boss 122, a cartridge cover 124, a lever switch 126, a lever spring 128, a PCB 130, a photo sensor chip 132, and a window member 134, thereby receiving a molecular diagnosis chip 200 to be inserted at an angle to facilitate insertion of the molecular diagnosis chip 200 and accommodating the molecular diagnosis chip 200.

The cartridge bottom member 102 is disposed at a lower part. In this embodiment, the cartridge bottom member 102 is shown as having a circular shape, but may have various shapes such as a square shape and a pentagonal shape.

The hinge sub-ring 104 is disposed along an outer edge of the cartridge bottom member 102 and is coupled to the cartridge bottom member 102. On a sidewall of the hinge sub-ring 104, a hole (not assigned a reference numeral) is formed for exposure of the lever switch 126. In addition, on an inner wall of the hinge sub-ring 104, a step (not given reference numeral) for the seating of the cartridge outline member 106 is formed.

The cartridge outline member 106 is accommodated in a space defined by the hinge sub-ring 104 that is coupled to the cartridge bottom member 102. The cartridge outline member 106 includes a flat central part and partition parts that protrude upward on respective both sides of the central part. The central part is defined by two long sides and two arcs in the shape of a circular arc. Each of the partition parts has a shape obtained by cutting a portion of a circle when the cartridge outline member 106 is viewed from the upper surface. Each of the partition parts is seated on the step formed on the hinge sub-ring 104.

The chip sliding member 108 has a shape surrounding the molecular diagnosis chip 200, is disposed on the cartridge outline member 106, and is configured to accommodate the molecular diagnosis chip 200 inserted in an inclined direction. Specifically, the chip sliding member 108 includes a bottom part, a first sidewall part, a first edge part, a second sidewall part, and a second edge part. The bottom part has a rectangular shape. The first sidewall part is bent upward at one edge of the bottom part. The first edge part is bent inward from the first sidewall part, and a first sliding hole 108*a* and a second sliding hole 108*b* are formed. The second sidewall part is bent upward at the other edge of the bottom part. The second edge part is bent inward from the second sidewall part.

The torsion springs 110 are coupled to seesaw shafts protruding from an inner wall of the cartridge outline member 106, and is configured to support the chip sliding member 108 to be inclined with respect to the cartridge bottom member 102 when operating in an open mode and support the chip sliding member 108 in parallel with the cartridge bottom member 102 when operating in a closed mode. Specifically, the torsion springs 110 include a first torsion spring 110*a* and a second torsion spring 110*b*. The first torsion spring 110*a* is coupled to a first seesaw shaft 106*a* protruding from a first inner wall of the cartridge outline member 106. The second torsion spring 110*b* is coupled to a second seesaw shaft 106*b* protruding from a second inner wall of the cartridge outline member 106.

Accordingly, the molecular diagnosis chip 200 is inserted into the chip sliding member 108 to be inclined, making it possible to easily insert the molecular diagnosis chip 200. In addition, as the cartridge cover 124 is pressurized, the chip sliding member 108 accommodating the molecular diagnosis chip 200 moves toward the cartridge bottom member 102 by the seesaw movement about the first seesaw shaft 106*a* and the second seesaw shaft 106*b*, so that the molecular diagnosis chip 200 disposed in the chip sliding member 108 may be seated in the molecular diagnosis cartridge.

The first chip sliding clip 112 is disposed in a space defined by the bottom part, the first sidewall part, and the first edge part, included a first sliding protrusion 112*a* protruding to correspond to the first sliding hole 108*s* and a second sliding protrusion 112*b* protruding to correspond to the second sliding hole 108*b*, and fixes the inserted molecular diagnosis chip 200.

The coil spring 114 disposed between the first sidewall part and the first chip sliding clip 112 and is configured to retract or withdraw the first sliding clip fixing the molecular diagnosis chip 200 in a sliding manner.

The wire spring 116 is disposed to correspond to a valley formed in the first chip sliding clip 112, includes one end serving as a guide and the other end acting as a helmsman, and is configured to move along the valley while bending.

The first updown sliding boss 118 is coupled to the outer side of the first sidewall part to face the first chip sliding clip 112 with respect to the first sidewall part.

The second chip sliding clip 120 is disposed in a space defined by the bottom part, the second sidewall part, and the second edge part, and fixes the inserted molecular diagnosis chip 200.

The second updown sliding boss 122 is coupled to the outer side of the second sidewall part to face the second chip sliding clip 112 with respect to the second sidewall part.

The cartridge cover 124 includes a hinge groove formed to accommodate a first hinge protrusion and a second hinge protrusion of the hinge sub-ring 104, and is partially coupled to the hinge sub-ring 104 as the first hinge protrusion and the second hinge protrusion are inserted into the hinge groove.

A body of the lever switch 126 is disposed on the inner wall of the hinge sub-ring 104, and a finger protrusion formed on the body is exposed to an outer side through a hole formed in the inner wall of the hinge sub-ring 104.

In the lever spring 128, one end is coupled to the inner wall of the hinge sub-ring 104, and the other end is coupled to one side of the lever switch 126.

The PCB 130 is disposed between the cartridge outline member 106 and the cartridge bottom member 102.

The photo sensor chip 132 is mounted on the PCB 130. Here, in each of the cartridge outline member 106 and the chip sliding member 108, a through hole is formed to expose the photo sensor chip 132.

The window member 134 is disposed on the molecular diagnosis chip 200 inserted into the chip sliding member 108 to press the molecular diagnosis chip 200 according to a user's pressure, and is exposed to a hole formed in the cartridge cover 124.

Figure 4A:
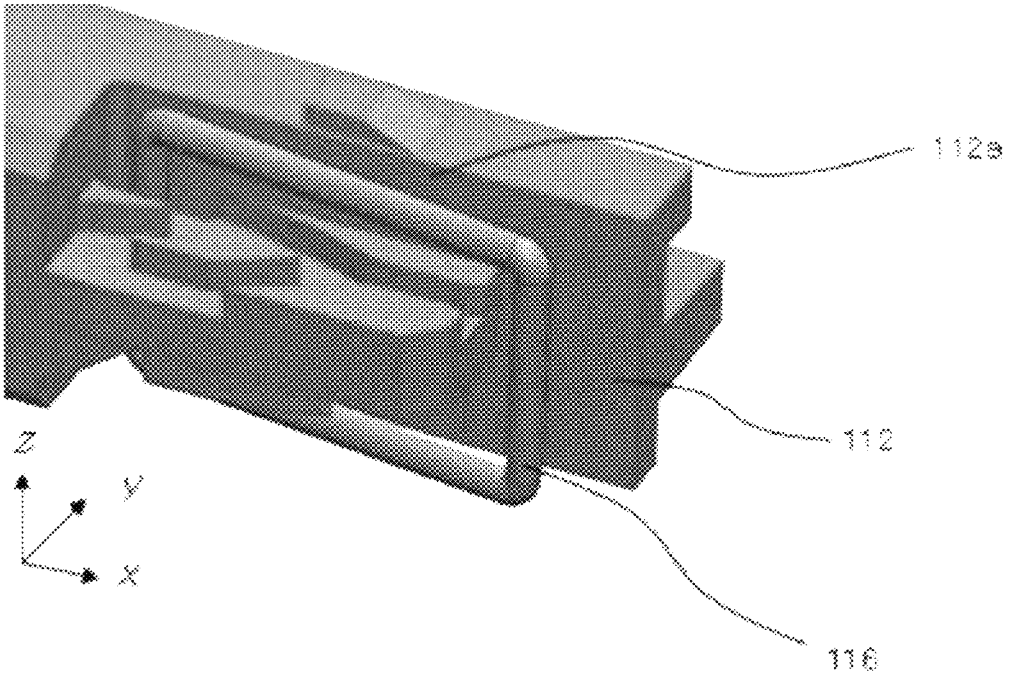
FIG. 4A is a first perspective view for explaining a wire spring coupled to a first chip sliding clip shown in FIG. 2.
Figure 4B:
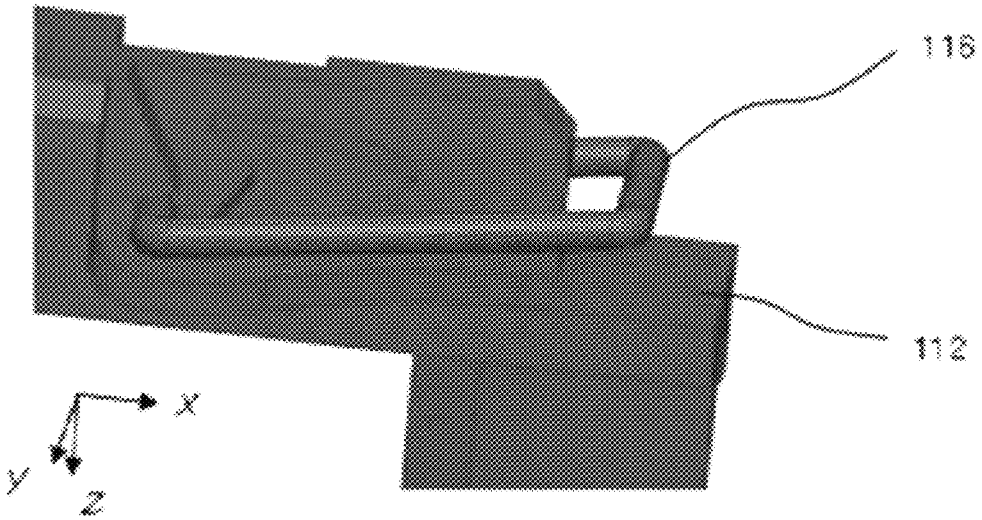
FIG. 4B is a second perspective view for explaining a wire spring coupled to a first chip sliding clip shown in FIG. 2.

FIG. 4A is a first perspective view for explaining the wire spring 116 coupled to the first chip sliding clip 112 shown in FIG. 2, and FIG. 4B is a second perspective view for explaining the wire spring 116 coupled to the first chip sliding clip 112 shown in FIG. 2.

Referring to FIGS. 4A and 4B, the wire spring 116 has a square shape with a portion of the short side removed, and includes one end serving as a guide and the other end acting as a helmsman.

A first valley formed on one side of the edge of the first chip sliding clip 112 and a second valley formed on the other side of the edge of the first chip sliding clip 112 are formed differently from each other. One end of the wire spring 116 is disposed in contact with the first valley, and the other end of the wire spring 116 is disposed in contact with the second valley.

In other words, the wire spring 116 is disposed to correspond to the first valley and the second valley formed in the first chip sliding clip 112. Accordingly, as the first chip sliding clip 112 moves in the +X-axis direction or −X-axis direction, the wire spring 116 is twisted and moves along the first valley and the second valley.

Figure 5:
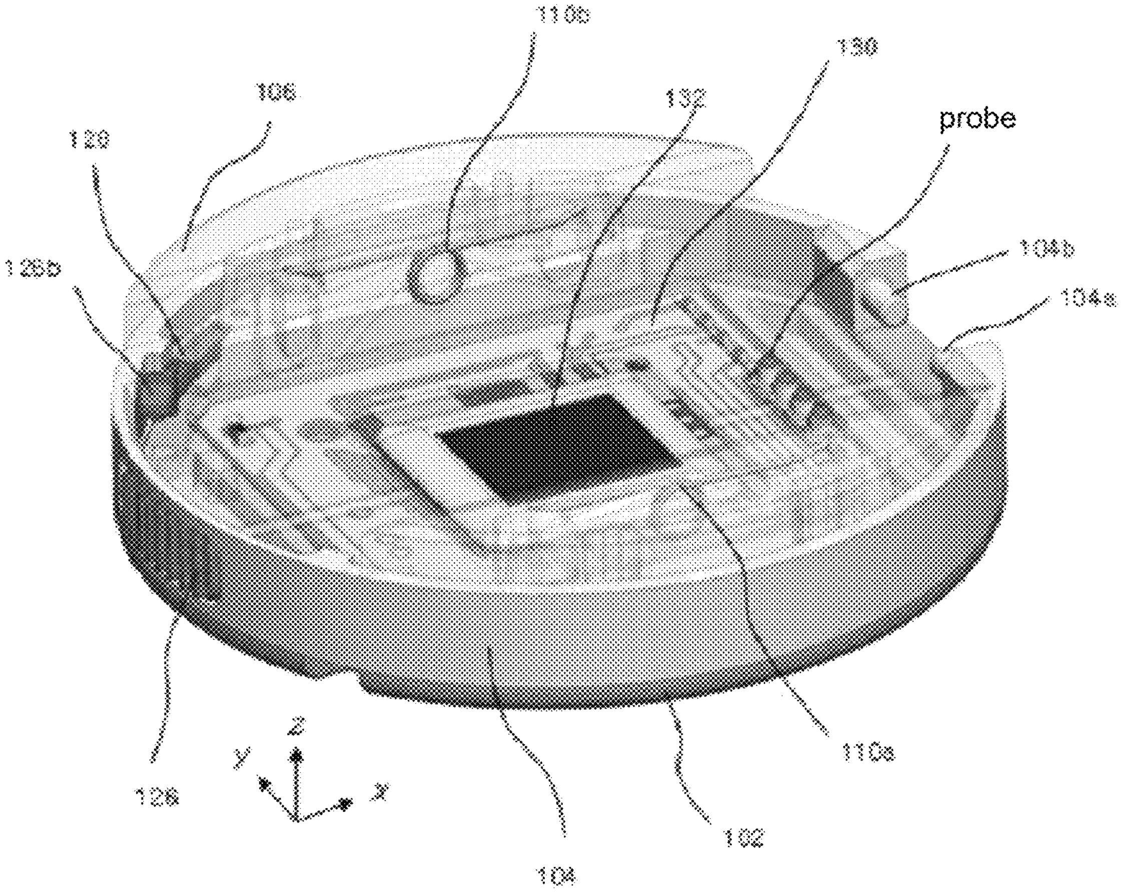
FIG. 5 is a perspective view for explaining a torsion spring shown in FIG. 2.
Figure 6A:
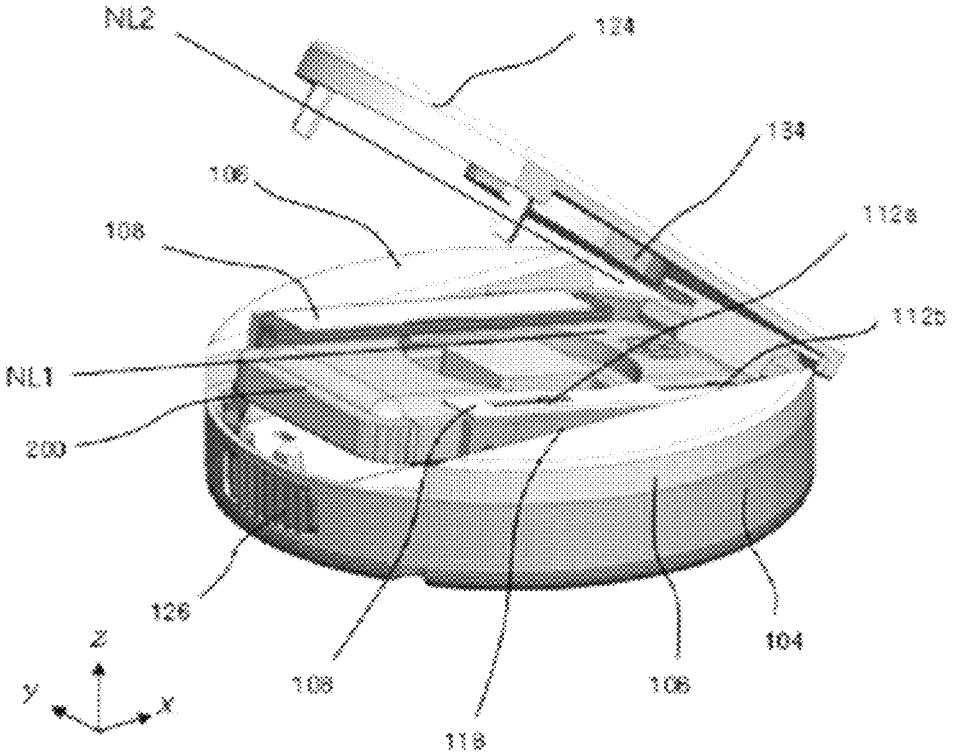
FIG. 6A is a perspective view for explaining an operation of the torsion spring shown in FIG. 2.
Figure 6B:
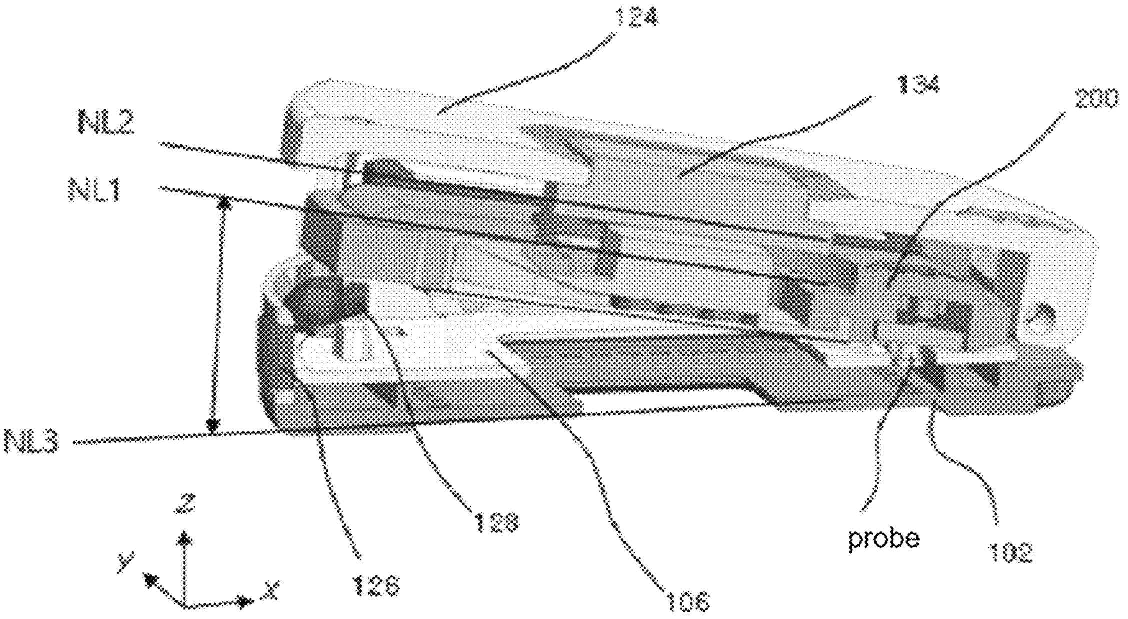
FIG. 6B is a cross-sectional perspective view.

FIG. 5 is a perspective view for explaining the torsion springs shown in FIG. 2. FIG. 6A is a perspective view and FIG. 6B is a cross-sectional perspective view for explaining an operation of the torsion springs shown in FIG. 2. In FIG. 5, the cartridge outline member 106 is shown transparent so that the first torsion spring 110*a*, the second torsion spring 110*b*, and the lever spring 128 can be seen.

Referring to FIGS. 5, 6A, and 6B, the hinge sub-ring 104 disposed on the cartridge bottom member 102 has a circular edge shape. The hinge sub-ring 104 has a first ring protrusion 104*a* and a second ring protrusion 104*b* for hinge coupling with the cartridge cover 124. The first ring protrusion 104*a* and the second ring protrusion 104*b* define a hinge shaft.

The first torsion spring 110*a* and the second torsion spring 110*b* are fitted into protrusions formed on the partition parts of the cartridge outline member 106. Each of the first torsion spring 110*a* and the second torsion spring 110*b* inserted into the protrusion rotates upward or downward based on the protrusion.

As shown in FIG. 6A, when the cartridge cover 124 is pressed downward by the user after the molecular diagnosis chip 200 is inserted into the chip sliding member 108, as shown in FIG. 6B, the first torsion spring 110*a* and the second torsion spring 110*b* allow an extension line NL1 of the molecular diagnosis chip 200 and an extension line NL2 of the cartridge cover 124 to contact each other in a parallel state.

Subsequently, when the user additionally presses the cartridge cover 124, the first torsion spring 110*a* and the second torsion spring 110*b* convert the extension line NL1 of the molecular diagnosis chip 200 and an extension line NL3 of the cartridge bottom member 102 into a parallel state. Accordingly, the molecular diagnosis chip 200 is seated in the cartridge outline member 106.

Meanwhile, the first torsion spring 110*a* and the second torsion spring 110*b* lift the molecular diagnosis chip 200 to its initial state (i.e., the state shown in FIG. 6*a*) even if the cartridge cover 124 is closed and opened.

Figure 7A:
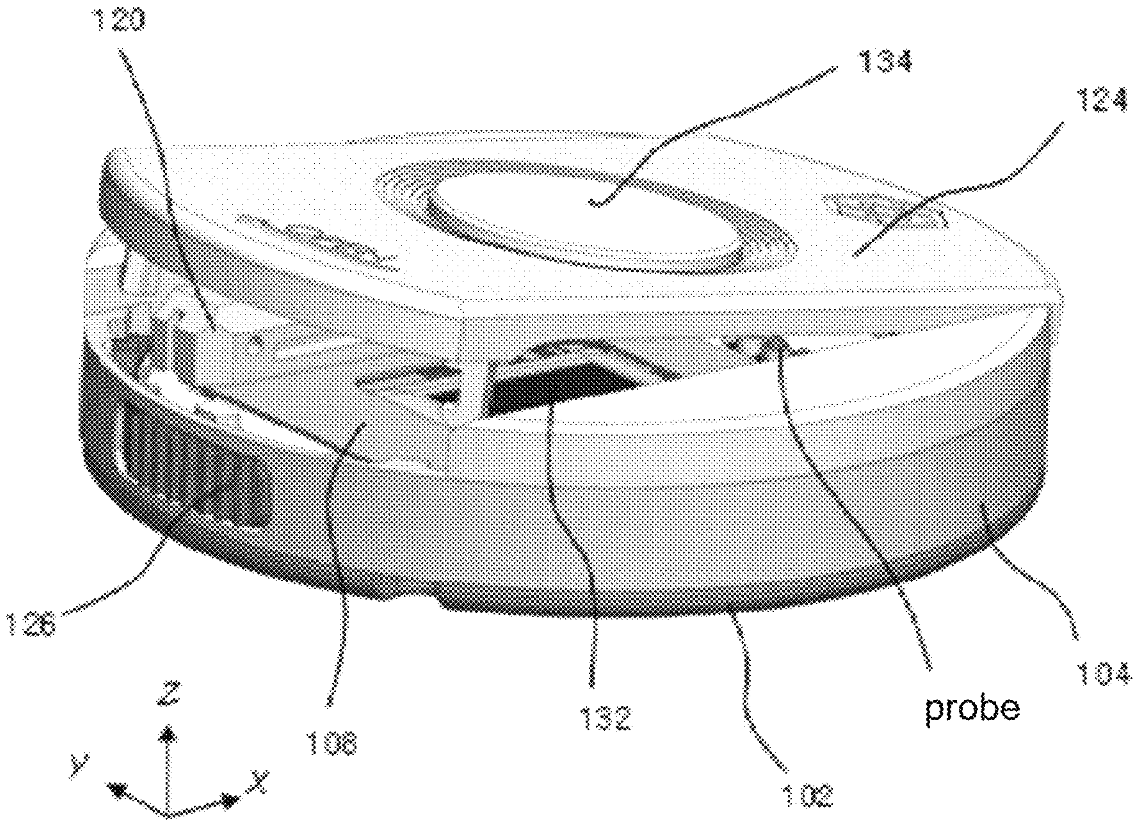
FIG. 7A is a perspective view illustrating the molecular diagnosis cartridge before pressing a cartridge cover shown in FIG. 2.
Figure 7B:
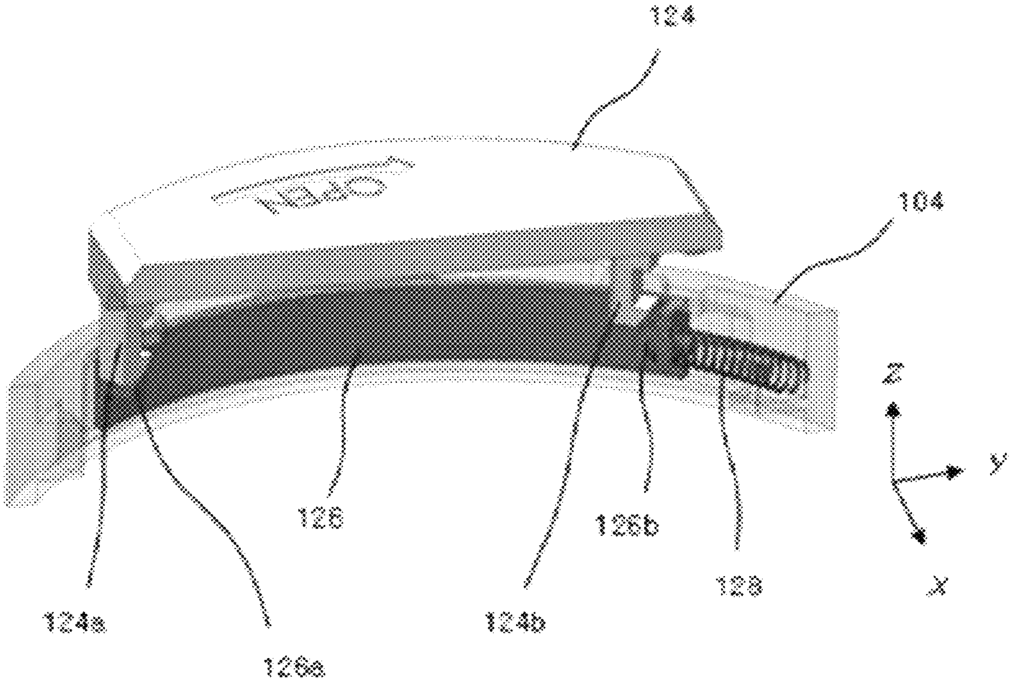
FIG. 7B is a perspective view of the cartridge cover, a lever switch, and a lever spring before pressing the cartridge cover shown in FIG. 2.

FIG. 7A is a perspective view illustrating the molecular diagnosis cartridge before pressing the cartridge cover 124 shown in FIG. 2, and FIG. 7B is a perspective view of the cartridge cover 124, the lever switch 126, and the lever spring before pressing the cartridge cover 124 shown in FIG. 2.

Referring to FIGS. 7A and 7B, a first cover protrusion 124*a* and a second cover protrusion 124*b* are formed downward on the cartridge cover 124. Edges of the first cover protrusion 124*a* and the second cover protrusion 124*b* are bent to face the lever spring 128.

On both sides of the lever switch 126, a first lever protrusion 126*a* and a second lever protrusion 126*b* are formed. Each of the first lever protrusion 126*a* and the second lever protrusion 126*b* has an inclined shape so as to move toward the lever spring 128 as the edges of the first cover protrusion 124*a* and the second cover protrusion 124*b* are pressed downward. In other words, the curved edges of the first cover protrusion 124*a* and the second cover protrusion 124*b* of the lever switch 126 have inclined shapes, and the edges of the first cover protrusion 124*a* and the second cover protrusion 124*b* of the lever switch 126 also have inclined shapes. Inclined parts of the curved edges of the first protrusion and the second protrusion and inclined parts of the edges of the first protrusion 124*a* and the second cover protrusion 124*b* are disposed to face each other.

When the cartridge cover 124 is pressed by the user and the cartridge cover 124 moves downward, the first cover protrusion 124*a* and the second cover protrusion 124*b* of the cartridge cover 124 press the first lever protrusion 126*a* and the second lever protrusion 126*b* of the lever switch 126.

When the first lever protrusion 126*a* and the second lever protrusion 126*b* of the lever switch 126 are pressed, the first lever protrusion 126*a* and the second lever protrusion 126*b* are moved toward the lever spring 128 and the cartridge cover 124 is further moved downward, and then each of the first cover protrusion 124*a* and the second cover protrusion 124*b* and each of the first lever protrusion 126*a* and the second lever protrusion 126*b* are engaged and coupled with each other. Accordingly, the cartridge cover 124 is pushed downward and locked.

Figure 8A:
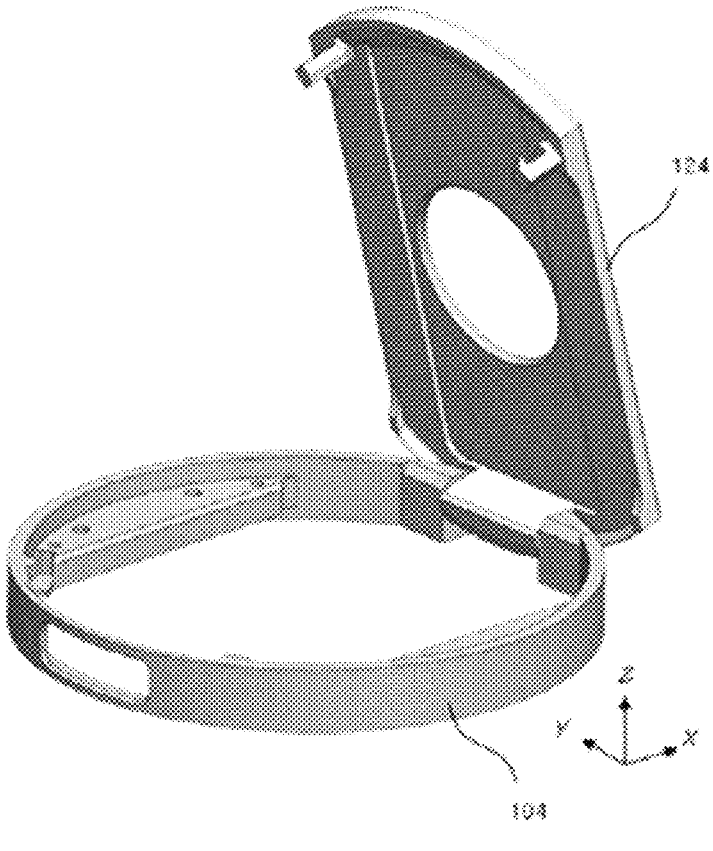
FIG. 8A is a perspective view illustrating a hinge sub-ring and the cartridge cover shown in FIG. 2.
Figure 8B:
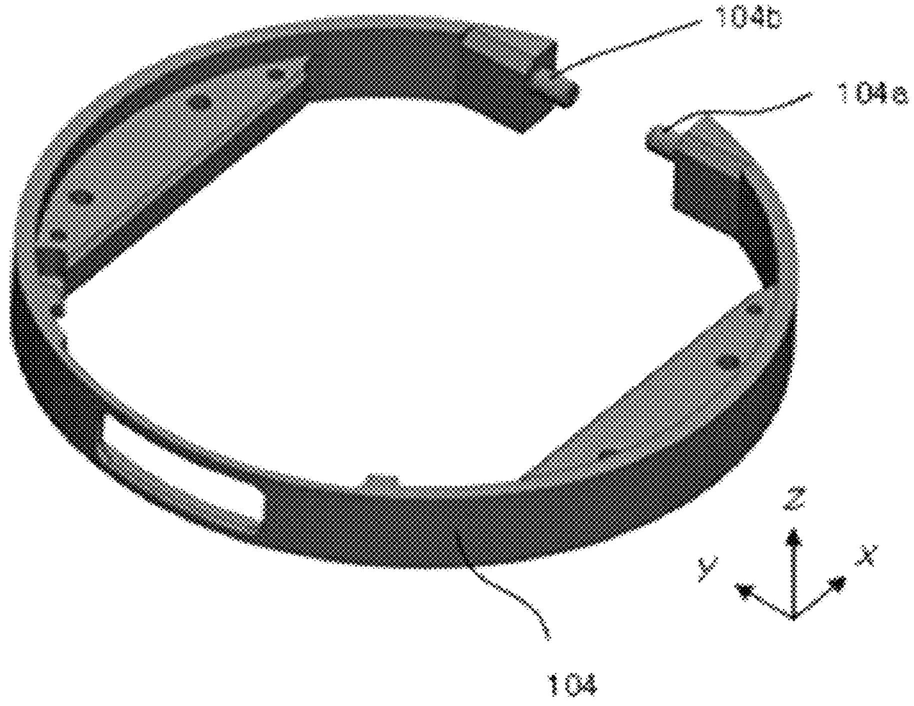
FIG. 8B is a perspective view illustrating the hinge sub-ring shown in FIG. 2.

FIG. 8A is a perspective view illustrating the hinge sub-ring 104 and the cartridge cover 124 shown in FIG. 2, and FIG. 8B is a perspective view illustrating the hinge sub-ring 104 shown in FIG. 2.

Referring to FIGS. 8A and 8B, the hinge sub-ring 104 has a circular edge shape. The hinge sub-ring 104 has the first ring protrusion 104*a* and the second ring protrusion 104*b* for hinge coupling with the cartridge cover 124. The first ring protrusion 104*a* and the second ring protrusion 104*b* define the hinge shaft.

A groove or hole is formed in the cartridge cover 124 so that the hinge shaft formed in the hinge sub-ring 104 may be inserted. When assembling, the hinge sub-ring 104 is opened and coupled to the cartridge cover 124.

As described above, according to the present disclosure, the molecular diagnosis chip is inserted to be inclined into the chip sliding member, making it possible to easily insert the molecular diagnosis chip, and as the cartridge cover is pressurized, the chip sliding member accommodating the molecular diagnosis chip moves toward the cartridge bottom member through a seesaw movement about the seesaw shaft, so that the molecular diagnosis chip disposed in the chip sliding member may be seated in the molecular diagnosis cartridge.

Although described above with reference to examples, those skilled in the art will understand that various modifications and changes may be made to the present disclosure without departing from the spirit and scope of the present disclosure as set forth in the appended claims.

<Explanation of Symbols>

| | |
|---|---|
| 102: Cartridge bottom member | 104: Hinge sub-ring |
| 106: Cartridge outline member | 108: Chip sliding member |
| 110: Torsion springs | 112: First chip sliding clip |
| 114: Coil spring | 116: Wire spring |
| 118: First updown sliding boss | 120: Second chip sliding clip |
| 122: Second updown sliding boss | 124: Cartridge cover |
| 126: Lever switch | 128: Lever spring |
| 130: PCB | 132: Photo sensor chip |
| 134: Window member | |

INDUSTRIAL APPLICABILITY

According to a molecular diagnosis cartridge of the present disclosure, a molecular diagnosis chip is inserted to be inclined into a chip sliding member, making it possible to easily insert the molecular diagnosis chip, and as a cartridge cover is pressurized, the chip sliding member accommodating the molecular diagnosis chip moves toward a cartridge bottom member through a seesaw movement about a seesaw shaft, so that the molecular diagnosis chip disposed in the chip sliding member may be seated in the molecular diagnosis cartridge.

The invention claimed is:

1. A molecular diagnosis cartridge accommodating a molecular diagnosis chip, comprising:

a cartridge bottom member disposed at a lower part;

a hinge sub-ring disposed along an outer edge of the cartridge bottom member;

a cartridge outline member accommodated in a space defined by the hinge sub-ring coupled to the cartridge bottom member;

a chip sliding member which has a shape surrounding the molecular diagnosis chip, is disposed on the cartridge outline member, and is configured to accommodate the molecular diagnosis chip inserted in an inclined direction; and torsion springs coupled to seesaw shafts protruding from an inner wall of the cartridge outline member, and configured to support the chip sliding member to be inclined with respect to the cartridge bottom member when operating in an open mode and support the chip sliding member in parallel with the cartridge bottom member when operating in a closed mode.

2. The molecular diagnosis cartridge of claim 1, wherein the torsion springs comprises:

a first torsion spring coupled to a first seesaw shaft protruding from a first inner wall of the cartridge outline member; and a second torsion spring coupled to a second seesaw shaft protruding from a second inner wall of the cartridge outline member.

3. The molecular diagnosis cartridge of claim 1, wherein the chip sliding member comprises:

a bottom part;

a first sidewall part bent upward at one edge of the bottom part;

a first edge part bent inward from the first sidewall part and formed with a first sliding hole and a second sliding hole;

a second sidewall part bent upward at the other edge of the bottom part; and a second edge part bent inward from the second sidewall part.

4. The molecular diagnosis cartridge of claim 3, further comprising:

a first chip sliding clip which is disposed in a space defined by the bottom part, the first sidewall part, and the first edge part, comprises a first sliding protrusion protruding to correspond to the first sliding hole and a second sliding protrusion protruding to correspond to the second sliding hole, and is configured to fix the inserted molecular diagnosis chip;

a coil spring disposed between the first sidewall part and the first chip sliding clip and configured to retract or withdraw the first sliding clip fixing the molecular diagnosis chip in a sliding manner;

a wire spring which is disposed to correspond to a valley formed in the first chip sliding clip, comprises one end serving as a guide and the other end acting as a helmsman, and is configured to move along the valley while bending; and a first updown sliding boss coupled to an outer side of the first sidewall part to face the first chip sliding clip with respect to the first sidewall part.

5. The molecular diagnosis cartridge of claim 4, further comprising:

a second chip sliding clip disposed in a space defined by the bottom part, the second sidewall part, and the second edge part, and configured to fix the inserted molecular diagnosis chip; and a second updown sliding boss coupled to an outer side of the second sidewall part to face the second chip sliding clip with respect to the second sidewall part.

6. The molecular diagnosis cartridge of claim 1, further comprising a cartridge cover which comprises a hinge groove formed to accommodate a first hinge protrusion and a second hinge protrusion of the hinge sub-ring, and is configured to be partially coupled to the hinge sub-ring as the first hinge protrusion and the second hinge protrusion are inserted into the hinge groove.

7. The molecular diagnosis cartridge of claim 6, further comprising:

a lever switch, wherein a body of the lever switch is disposed on an inner wall of the hinge sub-ring, and a finger protrusion formed on the body is exposed to an outer side through a hole formed in the inner wall of the hinge sub-ring; and a lever spring in which one end is coupled to the inner wall of the hinge sub-ring, and the other end is coupled to one side of the lever switch.

8. The molecular diagnosis cartridge of claim 1, further comprising:

a PCB disposed between the cartridge outline member and the cartridge bottom member; and a photo sensor chip mounted on the PCB.

9. The molecular diagnosis cartridge of claim 8, wherein a through hole is formed to expose the photo sensor chip in each of the cartridge outline member and the chip sliding member.

10. The molecular diagnosis cartridge of claim 1, further comprising a window member disposed on the molecular diagnosis chip inserted into the chip sliding member to press the molecular diagnosis chip according to a user's pressure, and exposed to a hole formed in the cartridge cover.

* * * * *